United States Patent [19]
Kihn

[11] 3,817,233
[45] June 18, 1974

[54] VAPOR FUEL CARBURETION SYSTEM
[75] Inventor: Harold E. Kihn, Pacific, Wash.
[73] Assignee: The Raymond Lee Organization, Inc., New York, N.Y. ; a part interest
[22] Filed: Sept. 18, 1972
[21] Appl. No.: 289,802

[52] U.S. Cl............................ 123/133, 123/122 H
[51] Int. Cl................................................ F02m 17/18
[58] Field of Search ............ 123/133, 122 R, 122 F, 123/122 E, 122 H, 34, 34 A, 35, 180 E; 261/140, 142

[56] References Cited
UNITED STATES PATENTS
2,884,917 5/1959 Quinby................................ 123/133

Primary Examiner—Manuel A. Antonakas
Assistant Examiner—R. H. Lazarus
Attorney, Agent, or Firm—Daniel Jay Tick

[57] ABSTRACT
A vapor fuel carburetion system for an internal combustion engine comprises a vaporizing device for vaporizing the fuel in the fuel reservoir of the engine. A directing system directs air and vaporized fuel to the compression chamber.

3 Claims, 1 Drawing Figure

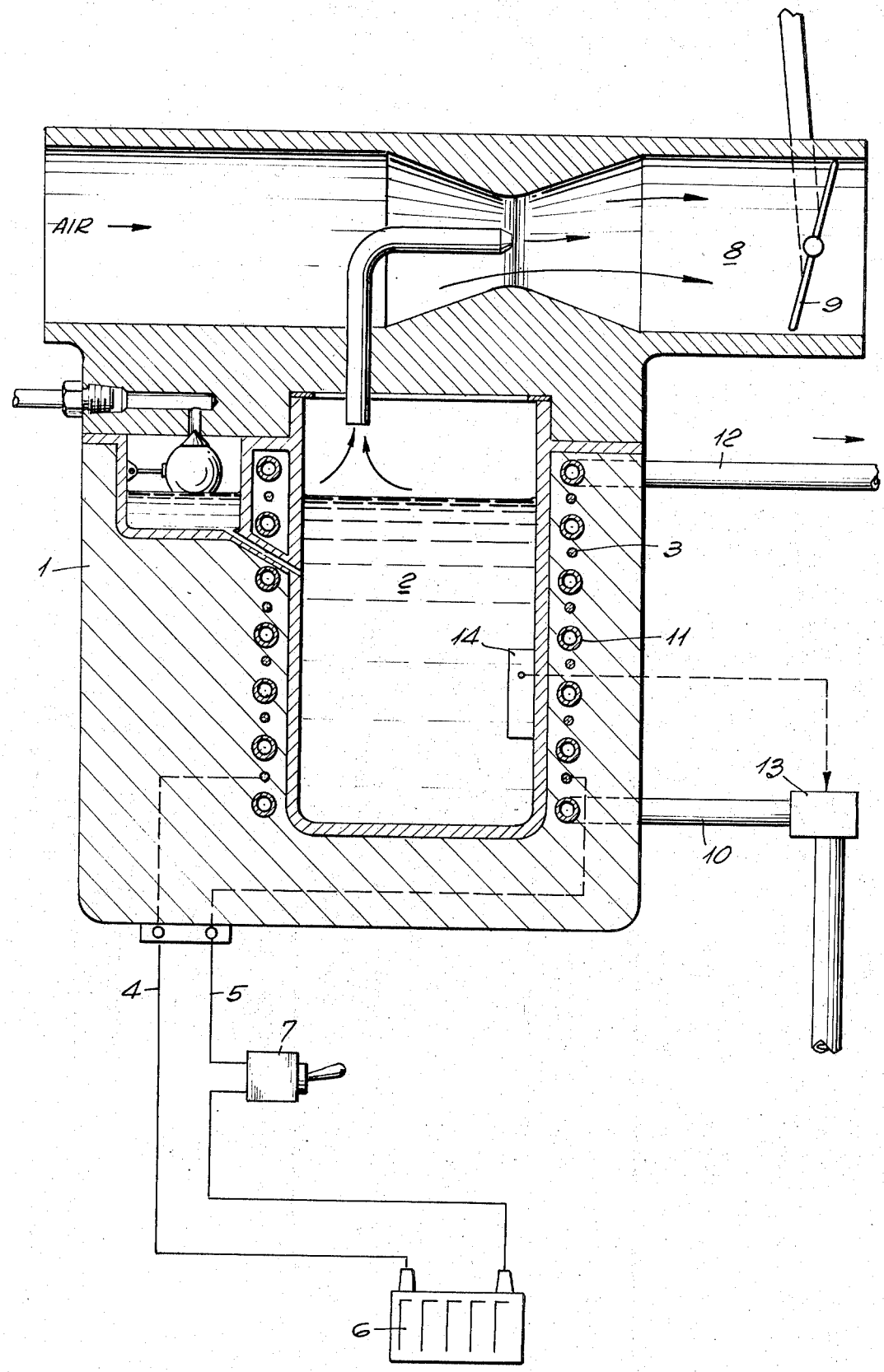

VAPOR FUEL CARBURETION SYSTEM

DESCRIPTION OF THE INVENTION

The present invention relates to a vapor fuel carburetion system.

The principal object of the invention is to provide a vapor fuel carburetion system which is of simple structure and provides efficient, effective and reliable engine operation with considerably reduced exhaust pollution.

In order that the invention may be readily carried into effect, it will now be described with reference to the accompanying drawing, wherein the single FIGURE is a schematic diagram, partly in section, of the vapor fuel carburetion system of the invention.

The vapor fuel carburetion system of the invention is for an internal combustion engine 1 having a compression chamber (not shown in the FIGURE) and a fuel reservoir 2.

The vapor fuel carburetion system of the invention comprises a vaporizing device for vaporizing the fuel in the fuel reservoir 2. The vaporizing device comprises an electrical heating device having electrical heating windings 3 around the fuel reservoir 2 and electrical conductors 4 and 5 connecting said windings to a battery 6, which may be the battery of the vehicle in which the engine is mounted, via a switch 7.

Air and the vaporized fuel are directed to the compression chamber (not shown in the FIGURE) of the engine via a venturi tube 8. A butterfly valve 9 in the venturi tube 8 controls the flow of vaporized fuel and air to the compression chamber.

A water cooling system is provided for the fuel reservoir 2. The water cooling system comprises water conducting tubing 10, 11, 12 for directing water to the area of the fuel reservoir 2 to cool the fuel. A flow control valve 13 in the tubing 10 controls the flow of water therethrough.

A temperature sensor 14 in the fuel reservoir 2 is connected to the flow control valve 13 for controlling the flow of water in the water cooling system. The water cooling system thus controls the temperature of the fuel in the fuel reservoir 2. When the fuel is heated to too great a temperature, the temperature sensor 14 opens the flow control valve to supply cooling water to the fuel reservoir 2.

While the invention has been described by means of specific examples and in specific embodiments, I do not wish to be limited thereto, for obvious modifications will occur to those skilled in the art without departing from the spirit and scope of the invention.

I claim:

1. A vapor fuel carburetion system for an internal combustion engine having a compression chamber and a fuel reservoir, said system comprising vaporizing means for vaporizing the fuel in the fuel reservoir, the vaporizing means comprising electrical heating means;

directing means for directing air and vaporized fuel to the compression chamber, the engine having a venturi tube supplying the vaporized fuel to the compression chamber and a butterfly valve in the venturi tube for controlling the flow of vaporized fuel and air to the compression chamber;

water cooling means having water conducting means for directing water to the area of the fuel reservoir to cool the fuel;

flow control means in the water conducting means for controlling the flow of water therethrough; and temperature sensing means in the fuel reservoir and connected to the flow control means for controlling the flow of water in the water conducting means.

2. A vapor fuel carburetion system as claimed in claim 1, wherein the electrical heating means comprises electrical heating windings around the fuel reservoir.

3. A vapor fuel carburetion system as claimed in claim 1, wherein the water cooling means comprises tubing in the area of the fuel reservoir.

* * * * *